March 31, 1925.

E. H. MARSH, JR

CONVEYER

Filed May 16, 1924

1,531,711

INVENTOR.
Edward H. Marsh, Jr.
Edward C. Taylor
BY
ATTORNEY.

Patented Mar. 31, 1925.

1,531,711

UNITED STATES PATENT OFFICE.

EDWARD H. MARSH, JR., OF SPRINGFIELD, MASSACHUSETTS, ASSIGNOR TO THE FISK RUBBER COMPANY, OF CHICOPEE FALLS, MASSACHUSETTS, A CORPORATION OF MASSACHUSETTS.

CONVEYER.

Application filed May 16, 1924. Serial No. 713,669.

*To all whom it may concern:*

Be it known that I, EDWARD H. MARSH, Jr., a citizen of the United States of America, residing at Springfield, in the county of Hampden and State of Massachusetts, have invented certain new and useful Improvements in a Conveyer, of which the following is a specification.

This invention relates to conveying systems and has for its object the prevention of jamming when articles from a branch conveyer are mingled with a stream of articles on a main conveyer at substantially right angles thereto.

Referring to the drawings.

Figure 1:
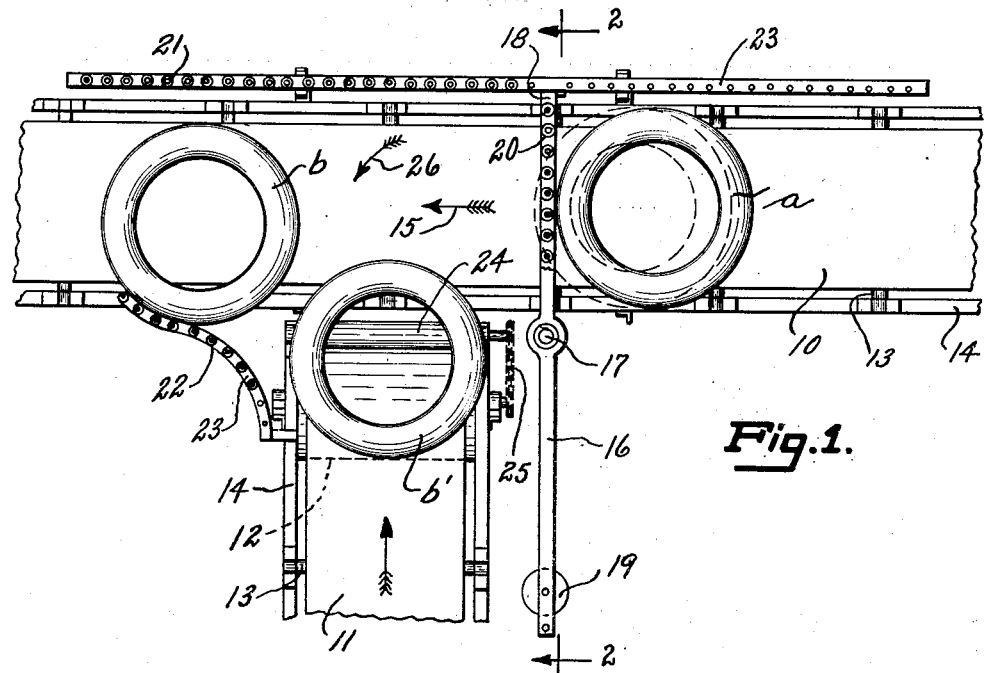
Fig. 1 is a fragmentary plan view showing a conveyer system, constructed according to my invention, for handling tire casings.

In the embodiment shown the apparatus is designed for handling automobile tire casings, as, for example, in a conveyer system for delivering such casings to storage after they have been inspected. Two conveyers, a main conveyer 10 and a branch conveyer 11, are shown, each being formed of a wide belt running around pulleys 12 and supported at intermediate points by rollers 13 carried by a framework 14. The particular construction and operation of these conveyers forms no part of the present invention except that the tires must be free to slip on the conveyor surface. The conveyer 10 carries a stream of articles *a* going in the direction of the arrow 15 in Figs. 1 and 3. These articles are somewhat spaced on the conveyer. The conveyer 11 feeds a second stream of articles *b* into the stream of articles on the conveyer 10 so that thereafter the two streams are merged upon the continuation of the main conveyer 10. It has been found that under these circumstances trouble is experienced at the point of intersection due to the articles jamming when an article *a* attempts to pass the point of intersection at the same time that an article *b* reaches this point. My invention is designed to attend to the feeding of the articles from the branch conveyer or the articles from the main conveyer past the point of intersection, without permitting any jamming.

Figure 2:
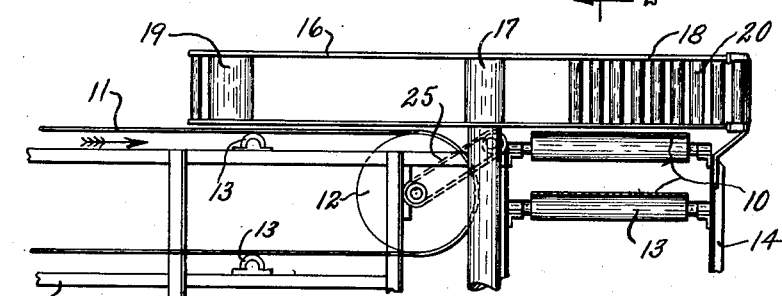
Fig. 2 is a section thereof on line 2—2 of Fig. 1.

In accomplishing this purpose I have provided a swinging gate 16 pivoted near the point of intersection of the two conveyers at 17 and extending at 18 so as to block either conveyer. The gate is preferably counterweighted at 19 and is mounted so as to swing freely in response to contact with the tires on either of the conveyers 10 or 11. A series of anti-friction rollers 20 is preferably mounted in the portion of the gate which extends across the conveyers, and similar series of anti-friction rollers 21 and 22 are placed respectively at the side of the conveyer 10 opposite conveyer 11 and at what may be called the down-stream point of intersection of the two conveyers. The rollers 22 may be replaced if desired by a single roller of larger diameter placed nearer the actual intersection. These anti-friction rollers are mounted in suitable frames 23 in a manner which can be varied to suit individual requirements and therefore need not be described in detail. In order to extend the driving power of conveyer 11 close to the side of conveyer 10 a roller 24 is preferably driven by a sprocket and chain arrangement 25 from the shaft of the adjacent pulley 12, this roller 24 being placed, as shown in Fig. 2, between the conveyer 10 and the point where conveyer 11 passes around the pulley.

Figure 3:
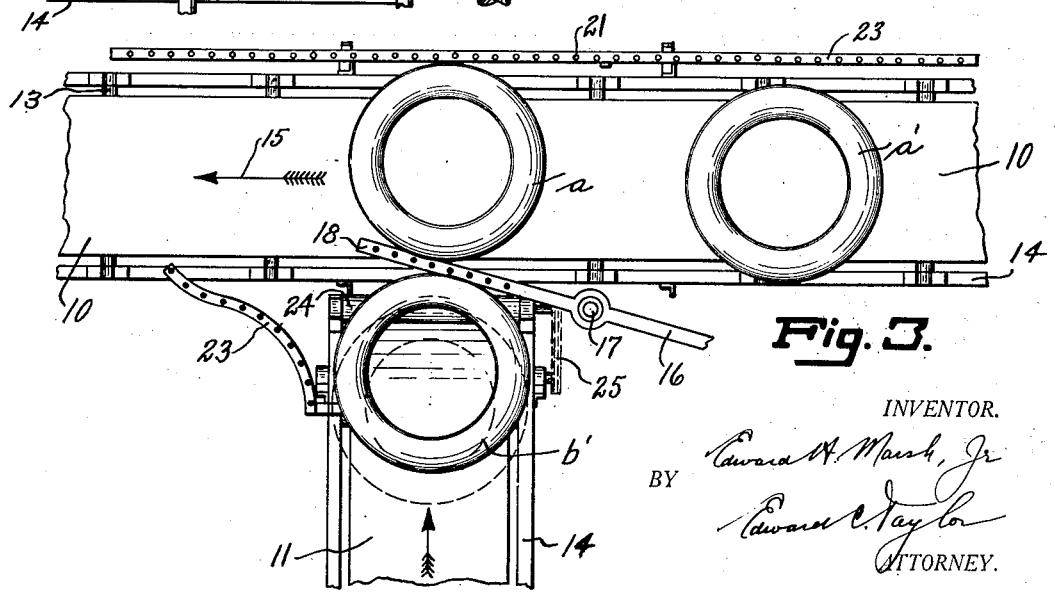
Fig. 3 is a view similar to Fig. 1 showing the parts in a different operative position.

The action of the device may be described with reference to Figs. 1 and 3. Fig. 1 shows the gate in a position to extend across conveyer 10. It should be understood that a similar although reverse operation of the device will occur if the gate happens to be positioned across conveyer 11. A tire *a* is shown just contacting with the anti-friction rollers on the gate. Due to the free pivotal mounting of the gate, and the frictional resistance between the article and the conveyer on which it is supported, a swinging motion will be imparted to the gate causing it to rotate in the direction of the arrow 26. A tire *b'* is also shown as entering upon conveyer 10 from conveyer 11. If no gate were provided this tire might interfere with the tire *a* and cause a jam. As the moving gate strikes this tire *b'*, however, its momentum will cause the tire to be pushed backward as indicated by the arrow placed on the tire in Fig. 3. The tire $a$ will be forced against the rollers 21 and will be carried past the point of intersection of the two conveyers, the tire $b'$ being held against forward movement by the gate during this motion. As soon as the tire $a$ has passed the end of the gate the friction of the conveyer 11 passing under tire $b'$ will cause the latter to move ahead, carrying the gate ahead of it and giving to the gate a sufficient momentum to block forward motion of the tire $a'$ which has been shown as following tire $a$ on conveyer 10.

The gate will function as described in whatever position it may be found by tires coming along the two conveyers. In general it may be said that the tire first to contact with the gate will thereby impart to it sufficient momentum to drive back a tire on the other conveyer, but it may well be that the gate might be contracted with simultaneously by tires $a$ and $b'$ in a position shown in Fig. 3. In this case jamming would be prevented owing to the tire $a$ being held between the anti-friction rollers 21 and rollers 20, this holding the gate in a position to block conveyer 10 and permit a tire $a$ to be driven ahead by the underlying conveyer 10. In case tires on the two conveyers come together so as to stop the gate at an angle of 45° across the main conveyer, it may be that they will both be halted temporarily. This condition of rest will be disturbed, however, when a succeeding tire comes down one of the conveyers, the impact of this tire with one of the others starting this latter tire by the gate, and normal operation will be again resumed. By whatever particular action the gate works it will be found that, as long as spaces are left between the articles on the conveyer, jamming will be effectively prevented at the point of intersection, and that this action in preventing jamming will be entirely automatic without requiring any attention on the part of the operator.

Having thus described my invention, I claim:

1. In a conveying apparatus wherein a main conveyer and a branch conveyer are each adapted to carry a succession of articles upon its surface, the two streams of articles merging at the junction of the conveyers; a device for preventing jamming of the articles at the junction, comprising a movable member adapted to contact with the articles on either conveyer, to receive motion therefrom, and by the momentum thus acquired to prevent temporarily forward motion of an article on the other conveyer.

2. In a conveying apparatus wherein a main conveyer and a branch conveyer are each adapted to carry a succession of articles upon its surfaces, the two streams of articles merging at the junction of the conveyers, a device for preventing jamming of the articles at the junction, comprising a swinging gate pivoted near the point of intersection of the conveyers and adapted to block either conveyer, the gate being heavy enough to acquire sufficient momentum from contact with an article on one conveyer to prevent temporarily forward movement of an article on the other conveyer.

EDWARD H. MARSH, Jr.